E. L. MICHEAU.
DRAWING PROTRACTOR.
APPLICATION FILED APR. 20, 1916. RENEWED DEC. 3, 1919.
1,342,129.
Patented June 1, 1920.
2 SHEETS—SHEET 1.
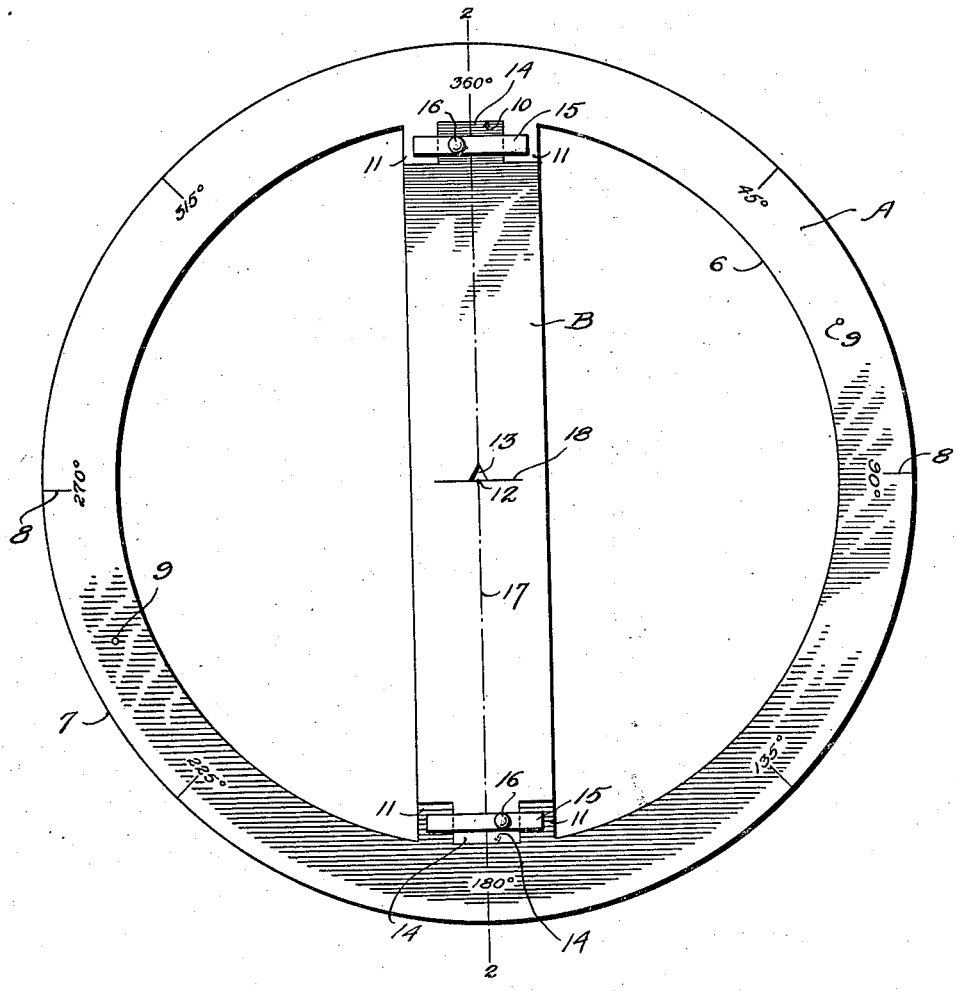
Fig. 1.
Fig. 2.
Fig. 3.
Inventor
Edward L. Micheau
By Lancaster and Allwine
His Attorneys

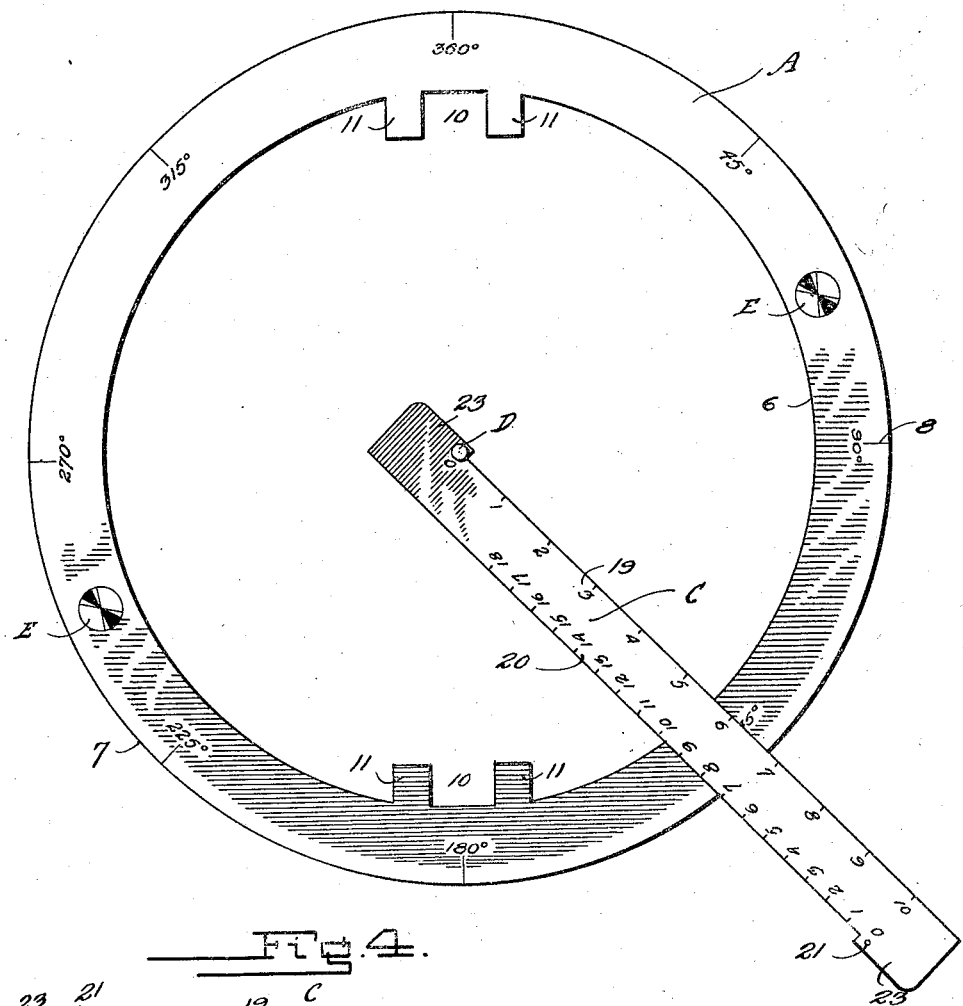
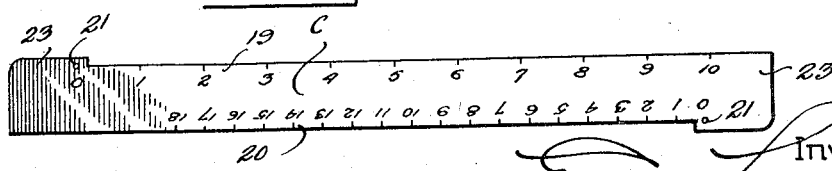

UNITED STATES PATENT OFFICE.

EDWARD L. MICHEAU, OF BALTIMORE, MARYLAND.

DRAWING-PROTRACTOR.

1,342,129.  Specification of Letters Patent.  Patented June 1, 1920.

Application filed April 20, 1916, Serial No. 92,430. Renewed December 3, 1919. Serial No. 342,301.

*To all whom it may concern:*

Be it known that I, EDWARD L. MICHEAU, a resident of Baltimore, in the State of Maryland, have invented a new and useful Improvement in Drawing-Protractors, of which the following is a specification.

My present invention relates to protractors used in drafting which can serve for all kinds of protracting, but is especially designed for use in the preparation of topographic drawings.

The principal objects of my invention are to provide a drawing protractor which is simple in construction, embodying parts so coöperating that any persons understanding the fundamental principles of drafting may bring it into practical use, dispensing with the preliminary directions of an instructor; an instrument of the character described which is inexpensive to manufacture and maintain in good repair; a protractor embodying an annular graduated limb, which may be accurately positioned upon the drawing paper, cloth or board, by aid of a templet, which is removable, permitting the field within the limb to be visible and accessible for placing delineations thereon; and, to provide a scale in combination with said graduated limb which, when the latter is temporarily secured to the drawing paper, cloth or board, will enable the user to locate various points from a given center, the said scale also serving as a straight-edge embodying a plurality of sets of graduations.

Other objects of the invention will appear in the following detailed description, taken in connection with the accompanying drawing, forming a part of this specification, and in which drawing:

Figure 1 is a plan view of a protractor constructed according to my invention, showing the removable templet in operative relation to the limb.

Fig. 2 is a sectional view on the line 2—2 of Fig. 1.

Fig. 3 is a view similar to Fig. 1 showing the templet removed, and a straight-edge, in operative relation to the limb.

Fig. 4 is a plan view of said straight-edge.

Fig. 5 is an elevation of a centering pin.

In the execution of surveys, especially topographic surveys by the "stadia" method, which forms the basis of engineering work, the relative position of natural and artificial features on the earth's surface is determined by an angle measured from a previously laid off base line to the point to be located, and a distance measured from the point on the base line along the line of the measured angle to the point to be located. It becomes necessary, therefore, in the preparation of topographic maps which are made from the survey notes, to plot a great many angles and distances upon paper. This is a comparatively slow and laborious undertaking with the ordinary angle protractors which are now in common use.

With the principal object of my invention in view, that is, to provide a much quicker, more direct and less laborious method of plotting the angles and distances contained in topographic survey notes, in the accompanying drawings I have shown the preferred construction of my invention, embodying the following elements in general: an annular graduated limb A; a removable templet B which may be placed in diametrical alinement within the plane of said limb; a scale or straight-edge C; a centering pin D; and, securing devices E for the limb, such as ordinary thumb tacks.

Referring first to the limb A which, in the present example, is shown as of annular shape, providing inner and outer edges 6 and 7, respectively, it may have delineated thereon any desired division of graduations 8, only the principal graduations such as 45 degrees, 90 degrees, etc., being shown in the present example. In order that the limb may be secured to the drawing board, as by the securing devices or thumb tacks E, it is provided with a plurality of transverse perforations 9, and for a purpose to be subsequently disclosed is preferably provided with recesses 10 formed adjacent diametrically opposite points. These recesses may be provided by a pair of lugs 11 disposed in spaced relation and extending inwardly from the edge 6 of the limb, two sets of lugs 11 being provided, as clearly shown in Fig. 3 of the drawing.

As to the templet B, it may be constructed of metal, or of transparent material, such as celluloid or xylonite, and is preferably of a size to fit within the plane of the limb A in diametrical alinement with predetermined graduations on the latter. In the example shown, the templet is in alinement with the graduation marks 180 degrees and 360 degrees, a centering delineation 12, such as a line or notch formed in a perforation 13 being equi-distant from the sides and ends of the templet. In the example shown, the templet is provided with reduced portions 14 fitting into the recesses 10, or, in other words, bounded laterally by the lugs 11 when the templet is in operative relation to the limb. The templet may also be provided with offsets 15, carried by the reduced portions 14, these offsets resting upon the lugs 11, so that the protractor may be transported with the templet in operative relation to the limb, without falling, due to the force of gravity, out of such operative position.

It is also desirable to provide one or more knobs or handles 16, which may be mounted upon the offsets 15, whereby the removal of the templet from operative relation to the limb may be facilitated. The perforation 13 is preferably triangular in shape with its vertex in the longitudinal axis of the templet, enabling the operator to more accurately place the protractor in operative relation to a given point on the drawing. The templet may also be provided with a longitudinally disposed delineation 17 parallel to the longitudinal axis, and a transverse delineation 18 which is at right angles to delineation 17. When the templet is made of transparent material, these delineations should be lowermost or, in other words, on the underside of the templet facilitating alinement with any given line or lines on the drawing.

Referring now to the scale or straight-edge C, in the present example it is shown provided with a plurality of sets of graduations 19 and 20, the sets differing in the spacing of the graduations. At the start, or zero point of each set I provide a perforation 21 of a diameter slightly greater than the pointed shank 22 of centering pin D, this perforation being in alinement with the edge of the scale to which the graduations lead. Each perforation 21 may be in a head 23, as clearly shown in Fig. 4 of the drawing.

When it is desired to lay off various angles and distances from a point on a base line, the limb with the templet is positioned in place over the base line so that the delineation 17, or the graduations marked 180 degrees and 360 degrees coincide with the base line on the map, and the centering delineation 12 is directly over the exact point on the base line. The limb A is then fastened down, as by the thumb tacks E, and the templet B removed. This leaves the plane within the limb accessible for placing delineations upon the drawing paper, cloth or board, as clearly shown in Fig. 3 of the drawing. The centering pin D is then positioned with its shank extending through the selected perforation 21 of scale C, and also inserted in the base line point, after which the scale is free to swing in a complete circle around the center of the pin, as a pivot. By reference to the delineations 8 on the limb, the scale may be placed at any required angle with respect to the base line, and the distance is scaled off the desired distance, being guided by either set of delineations 19 or 20. This method of plotting is very rapid and eliminates, through simplicity of operation, the tendency to error.

Changes in details may be made without departing from the spirit or scope of my invention; but,

I claim:

1. A protractor comprising in combination, an annular graduated plate provided with two pairs of inwardly extending lugs, and a templet of a size to fit flush with said plate and with its end portions between the said lugs.

2. A protractor comprising in combination, an annular graduated plate provided with two pairs of inwardly extending lugs, said pairs of lugs being disposed at diametrically opposite portions of the plate, and a templet of a size sufficient to fit flush with the said plate and with its end portions between the said lugs, and provided with a centering delineation equi-distant from its sides and ends.

3. A protractor comprising in combination, an annular graduated plate provided with two pairs of inwardly extending lugs, said pairs of lugs being disposed at diametrically opposite portions of the plate, and a templet of a size to fit flush with said plate and with its end portions between said lugs, and provided with a sight-opening equi-distant from its sides and ends.

4. A protractor comprising in combination, an annular graduated plate provided with two pairs of inwardly extending lugs, and a templet of a size to fit flush with said plate and with its end portions between said lugs, and provided with offsets to rest upon said lugs.

5. A protractor comprising in combination, an annular graduated plate provided with transverse recesses, and a removable templet fitting at opposite ends in the recesses flush with said plate.

6. A protractor comprising in combination, an annular graduated plate provided with transverse recesses, and a removable templet engaging at opposite ends in the recesses and being of a size to fit flush with said plate and in diametrical alinement with predetermined graduations of the latter.

EDWARD L. MICHEAU.